(12) United States Patent
Diaz

(10) Patent No.: US 10,414,349 B2
(45) Date of Patent: Sep. 17, 2019

(54) AUTONOMOUS FLIP-UP LICENSE PLATE MOUNT FOR MOTORCYCLES

(71) Applicant: Alejandro Diaz, Pasco, WA (US)

(72) Inventor: Alejandro Diaz, Pasco, WA (US)

( * ) Notice: Subject to any disclaimer, the term of this patent is extended or adjusted under 35 U.S.C. 154(b) by 0 days.

(21) Appl. No.: 16/274,434

(22) Filed: Feb. 13, 2019

(65) Prior Publication Data

US 2019/0248305 A1 Aug. 15, 2019

Related U.S. Application Data

(60) Provisional application No. 62/630,132, filed on Feb. 13, 2018.

(51) Int. Cl.

| | |
|---|---|
| *B60R 13/10* | (2006.01) |
| *B62J 99/00* | (2009.01) |
| *B60R 11/00* | (2006.01) |
| *G09F 21/04* | (2006.01) |

(52) U.S. Cl.
CPC .............. *B60R 13/105* (2013.01); *B62J 99/00* (2013.01); *B60R 2011/0082* (2013.01); *B60R 2011/0092* (2013.01); *B62J 2099/008* (2013.01); *G09F 21/04* (2013.01)

(58) Field of Classification Search
CPC ........... B60R 13/105; B60R 2011/0092; B60R 2011/0082; B62J 99/00; B62J 2099/008; G09F 21/04; G09F 21/048
See application file for complete search history.

(56) References Cited

U.S. PATENT DOCUMENTS

| 7,818,905 B1* | 10/2010 | Stahel ................... | B60R 13/105 |
| | | | 224/496 |
| 8,245,996 B1* | 8/2012 | Ciabaszewski ....... | B60R 13/105 |
| | | | 248/286.1 |
| 2003/0205101 A1* | 11/2003 | Harmon .................. | B60R 13/10 |
| | | | 74/501.6 |
| 2007/0001473 A1* | 1/2007 | Eidsmore .................. | B60P 1/24 |
| | | | 296/26.08 |
| 2014/0026451 A1* | 1/2014 | Gillespie ................. | G09F 13/04 |
| | | | 40/578 |
| 2017/0259758 A1* | 9/2017 | Torrey, Jr. ............. | B60R 13/105 |

* cited by examiner

*Primary Examiner* — Cassandra Davis

(57) ABSTRACT

An autonomous flip-up license plate mount for motorcycles that improves the aesthetics of a motorcycle while ensuring a license plate is properly displayed during use of the motorcycle. The mount includes a first mounting plate, a second mounting plate, an automatic pivoting mechanism, and a hinge mechanism. A first end of the first mounting plate is connected along the hinge mechanism. Additionally, the hinge mechanism is connected along a rear surface of the second mounting plate, allowing for relative rotation about a main axis of the hinge mechanism. The automatic pivoting mechanism includes a servomotor and a control linkage. The servomotor is adjacently mounted to the first mounting plate with the control linkage being mechanically engaged in between the servomotor and the second mounting plate. Activation of the servomotor positions the mount into either a functional configuration or a collapsed configuration.

12 Claims, 5 Drawing Sheets

US 10,414,349 B2

AUTONOMOUS FLIP-UP LICENSE PLATE MOUNT FOR MOTORCYCLES

The current application claims a priority to the U.S. Provisional Patent application Ser. No. 62/630,132 filed on Feb. 13, 2018.

FIELD OF THE INVENTION

The present invention relates generally to license plate holders, more specifically autonomous license plate holders that can readily install on to old-style and new-style motorcycles.

BACKGROUND OF THE INVENTION

In present times, motorcyclists are always trying to find ways to maximize the aesthetics of their motorcycles. Oftentimes, motorcyclists would often invest in manual-flip up license plates for their motorcycles. These conventional manual-flip up license plates must be concealed/deployed by the motorcyclist every time they park/drive, respectively. This often leads to motorcyclists forgetting to deploy the license plate when driving, leading to legal altercations with law enforcement. The present invention aims to solve this problem. The present invention is catered for cruisers, old style motorcycles, and any other type of motorcycle that uses the nut of the rear wheel axle or the suspension bolt. The present invention can also be used for new-style motorcycles, without altering the drive chain/belt tension of the rear wheel axle. The present invention is a movable mount that conceals the license plate of a motorcycle when the motorcycle is in the parked configuration, preserving the motorcycle's aesthetics. The present invention also comprises of an autonomous system that automatically deploys the concealed license plate when the user is driving the motorcycle.

DETAIL DESCRIPTIONS OF THE INVENTION

All illustrations of the drawings are for the purpose of describing selected versions of the present invention and are not intended to limit the scope of the present invention.

The present invention is a license plate mount for motorcycles. Specifically, the present invention is a license plate mount for motorcycles that may be positioned into two configurations, a functional configuration and a collapsed configuration. This allows the license plate to be folded out of sight when the motorcycle is not in use to maximize the aesthetics of the motorcycle; and, the license plate to be extended and legally displayed during use of the motorcycle. The present invention is designed ideally for cruisers, old style motorcycles, and any other type of motorcycle. Some examples of motorcycles that the present invention is designed for include, but are not limited to, Harleys, Cruisers, and Choppers, Café Racers, and Bobbers. Additionally, the present invention can also be used for new-style motorcycles without altering the drive chain/tension of the rear wheel axle.

Figure 1:
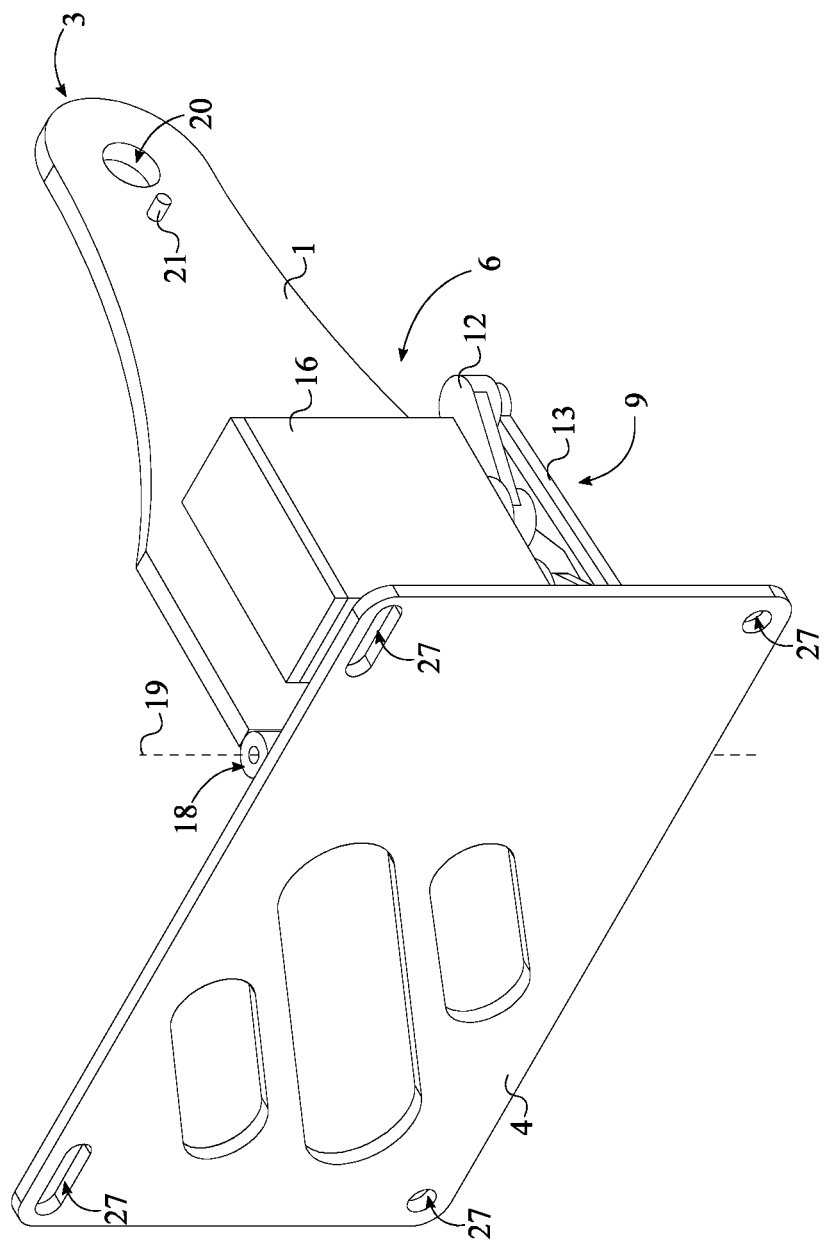
FIG. 1 is a perspective view of the present invention in a functional configuration.
Figure 2:
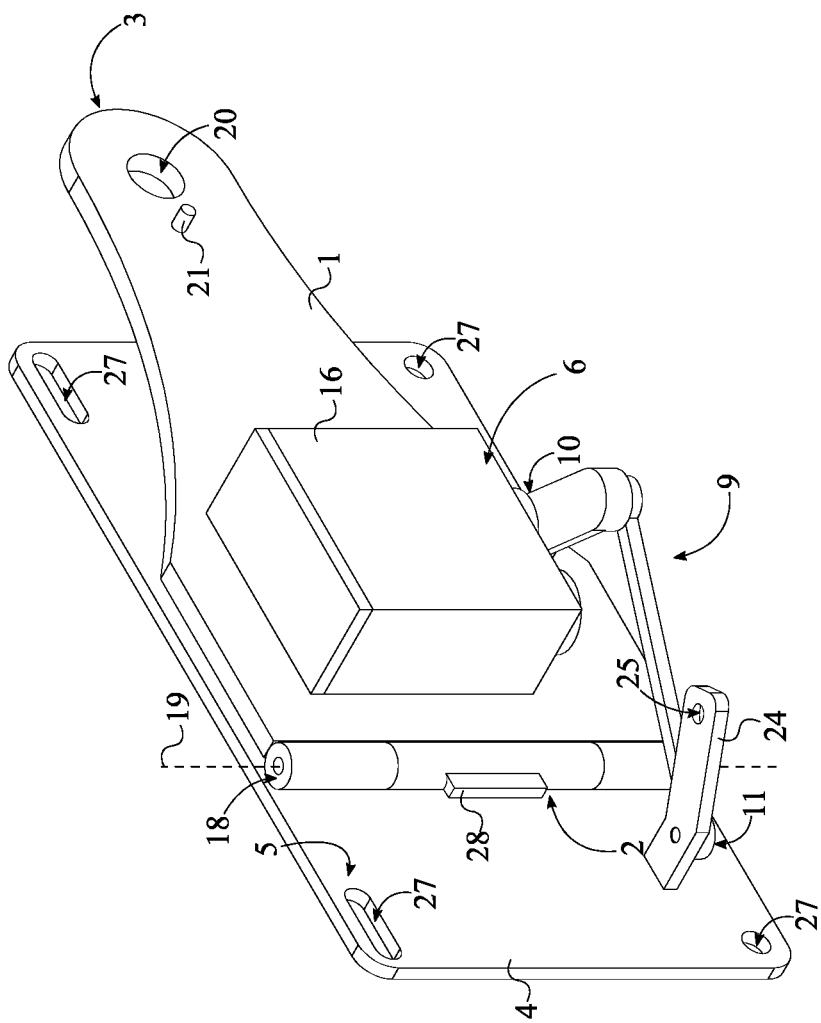
FIG. 2 is a perspective view of the present invention in a collapsed configuration.

Referring to FIG. 1, the present invention comprises a first mounting plate 1, a second mounting plate 4, an automatic pivoting mechanism 6, a hinge mechanism 18, a mounting hole 20, and a tension pin 21. The first mounting plate 1 attaches the present invention to the frame of a motorcycle. In particular, the first mounting plate 1 is designed to attach onto the rear axle or the suspension bolt with a nut or bolt head. The second mounting plate 4 attaches to a license plate. The second mounting plate 4 is preferably shaped and sized to the standard design of a motorcycle license plate; although alternative shapes, sized, and designs may also be used. The first mounting plate 1 and the second mounting plate 4 are hingedly attached to each other by the hinge mechanism 18 to allow for the second mounting plate 4 to be positioned at angle relative to the first mounting plate 1. The hinge mechanism 18 is a bearing that mechanically couples two objects and allows said objects to rotate relative to each other, specifically to be positioned at an angle relative to each other. It is preferred that the mechanical hinge is barrel hinge for the present invention. Referring to FIG. 2, a first end 2 of the first mounting plate 1 is adjacently connected to and along the hinge mechanism 18. The second mounting plate 4 is positioned adjacent to the hinge mechanism 18, opposite the first mounting plate 1. Additionally, the hinge mechanism 18 is connected to and along a rear surface 5 of the second mounting plate 4. Resultantly, the second mounting plate 4 is rotatably mounted to the first mounting plate 1 by the hinge mechanism 18, specifically about a main axis 19 of the hinge mechanism 18. In general, the hinge mechanism 18 allows for the first mounting plate 1 and the second mounting plate 4 to be positioned into the functional configuration and the collapsed configuration. In the functional configuration, the first mounting plate 1 is positioned perpendicular to the second mounting plate 4, when viewed from a top view the outline shape formed in the functional configuration is a T-shape. Additionally, the license plate is positioned perpendicular to the length/profile of the motorcycle, thus visually exposing the license plate for legal purposes. In the collapsed configuration, the second mounting plate 4 is positioned adjacent and parallel to the first mounting plate 1. The collapsed configuration is designed for increasing the aesthetics of the motorcycle when the motorcycle is parked and not in use. Specifically, the collapsed configuration aligns the license plate parallel and along the profile of the motorcycle.

Figure 3:
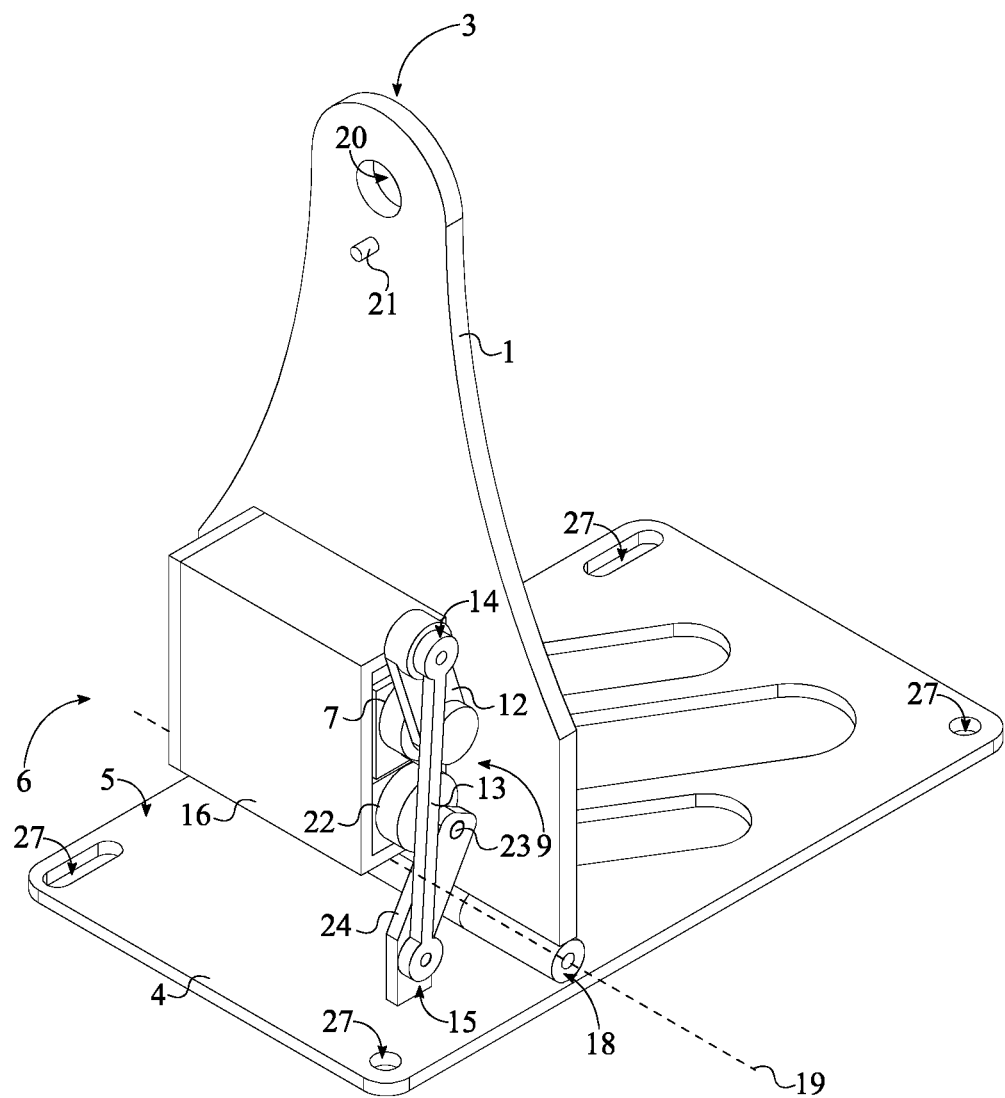
FIG. 3 is a bottom perspective view of the present invention.

The automatic pivoting mechanism 6 controls the configuration of the present invention, i.e. the automatic pivoting mechanism 6 mechanically rotates the first mounting plate 1 and the second mounting relative to each other about the hinge mechanism 18. The automatic pivoting mechanism 6 is positioned adjacent to the first end 2 of the first mounting plate 1 and comprises a servomotor 7 and a control linkage 9. The servomotor 7 is a motor with an output shaft 8 that can be precisely controlled in regard to the angular positioning of output shaft 8. The servomotor 7 is adjacently mounted to the first mounting plate 1 with an output shaft 8 of the servomotor 7 being oriented parallel and offset to the main axis 19 of the hinge mechanism 18 as seen in FIG. 3. The control linkage 9 acts as a crank arm for the servomotor 7 to convert rotational motion of the output shaft 8 into linear motion. The linear motion pushes or pulls the second mounting plate 4 to position the present invention into the collapsed configuration or the functional configuration. Specifically, the control linkage 9 pushes or pulls the second mounting plate 4 to force the second mounting plate 4 to rotate about the main axis 19 of the hinge mechanism 18. For this, a first end 10 of the control linkage 9 is torsionally mounted to the output shaft 8. Resultantly, a crankshaft is created wherein rotation of the output shaft 8 rotates the first end 10 of the control linkage 9 and translates a second end 11 of the control linkage 9. The second end 11 of the control linkage 9 is rotatably mounted to the rear surface 5 of the second mounting plate 4 to push or pull the second mounting plate 4 about the main axis 19 of the hinge mechanism 18. Specifically, the second end 11 of the control linkage 9 is rotatably mounted to the rear surface 5 of the second mounting plate 4, offset to the hinge mechanism 18; said offset distance acts as a crank arm for the second mounting plate 4.

The mounting hole 20 and the tension pin 21 serve as attachment points for the motorcycle. Specifically, a second end 3 of the first mounting plate 1 is mounted to the motorcycle through the mounting hole 20 and the tension pin 21. Referring to FIG. 3, the mounting hole 20 is a circular hole that is positioned adjacent to the second end 3 of the first mounting plate 1. Additionally, the mounting hole 20 normally traverses through the first mounting plate 1. The mounting hole 20 receives a rear-axle shaft or the suspension bolt of the motorcycle and thus is sized complimentary. The tension pin 21 is an elongated structural element that acts as a second engagement point between the motorcycle and the present invention to prevent the first mounting plate 1 from accidentally spinning about the rear-axle shaft. The tension pin 21 is positioned adjacent to the mounting hole 20, opposite the second end 3 of the first mounting plate 1, to coincide with a pin-receiving hole on the motorcycle. Additionally, the tension pin 21 is connected normal and adjacent to the first mounting plate 1. To mount the present invention, a user first removes the axle nut off of the rear-axle shaft. Then, the user positions the rear-axle shaft through the mounting hole 20 while simultaneously positioning the tension pin 21 within the pin-receiving hole. Finally, the user tightens the axle nut over the rear-axle shaft until the first mounting plate 1 is secure in place. Alternative mounting and securing means may also be utilized for motorcycles with different rear-axle shaft designs and different suspension bolt designs.

Figure 4:
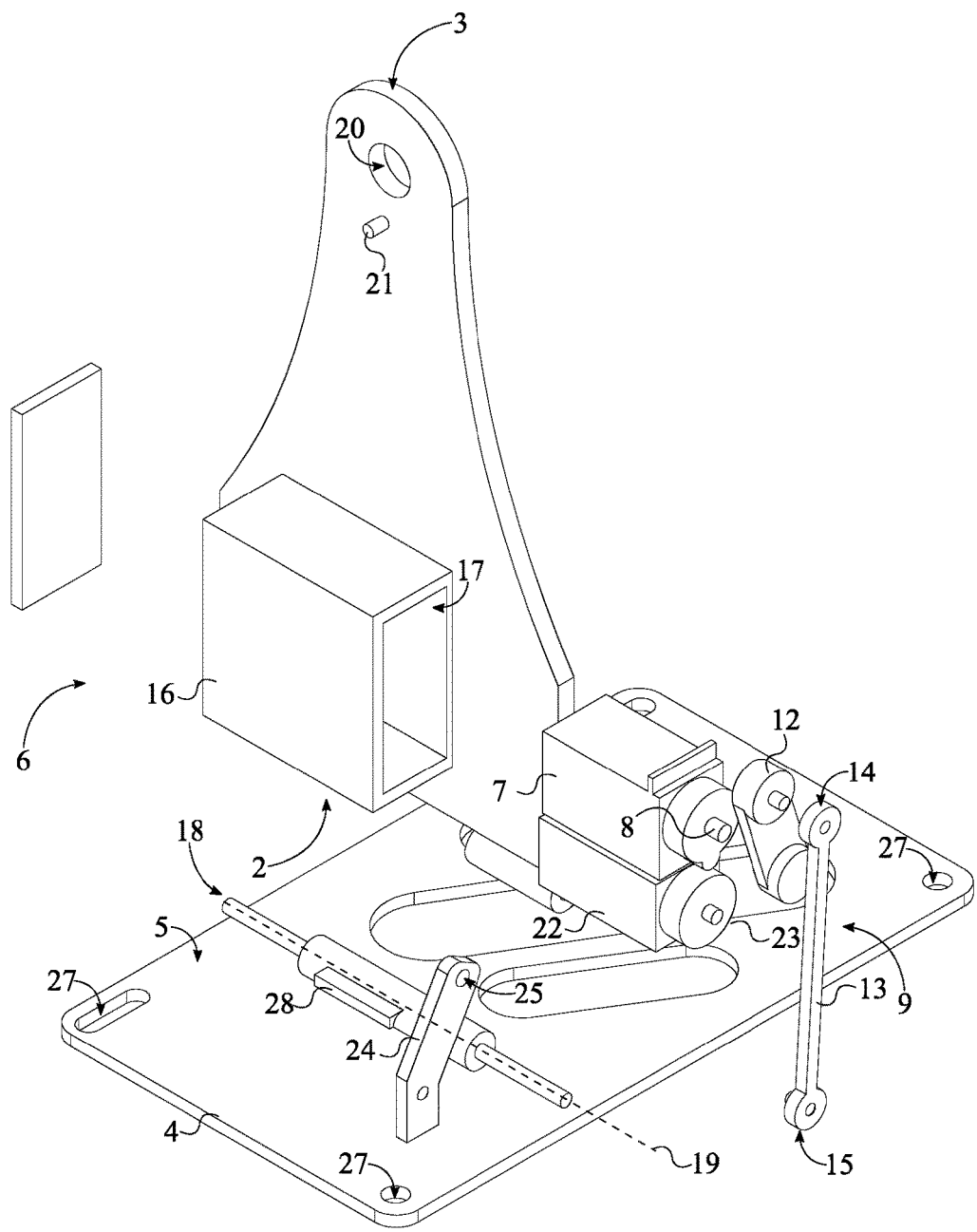
FIG. 4 is a bottom perspective view of the present invention in an exploded state.

Referring to FIG. 3 and FIG. 4, for the most efficient design, the control linkage 9 comprises a first control arm 12 and a second control arm 13. The first control arm 12 and the second control arm 13 are each an elongated link element. The first control arm 12 acts as a crank element for the servomotor 7 while the second control arm 13 couples the first control arm 12 to the second mounting plate 4. Specifically, the first control arm 12 is terminally and torsionally connected to the output shaft 8 of the servomotor 7. The second control arm 13 is positioned in between the first control arm 12 and the second mounting plate 4. In particular, a first end 14 of the second control arm 13 is rotatably mounted to the first control arm 12, opposite the servomotor 7.

A second end 15 of the second control arm 13 is positioned offset to the hinge mechanism 18, along the second mounting plate 4, to provide the second control arm 13 a moment arm relative to the hinge mechanism 18. Additionally, the second end 15 of the second control arm 13 is rotatably mounted to the second mounting plate 4.

Referring to FIG. 3, the automatic pivoting mechanism 6 further comprises a housing enclosure 16 and first hole 17.

The housing enclosure 16 covers and supports the servomotor 7. The housing enclosure 16 is positioned adjacent is adjacently connected to the first mounting plate 1. The housing enclosure 16 is positioned offset to the hinge mechanism 18 and is sized to receive the servomotor 7. The first hole 17 exposes a portion of the servomotor 7 for the servomotor 7 to be coupled to the control linkage 9. Specifically, the first hole 17 traverses into the housing enclosure 16, parallel to the of the first mounting plate 1. The servomotor 7 is positioned within the first hole 17 and is mounted within the housing enclosure 16. The servomotor 7 is oriented such that the output shaft 8 of the servomotor 7 extends out of the housing closure through the first hole 17.

When the present invention is in the functional configuration, random forces caused by the weight and vibrations from the road can often overload and or break the servomotor 7. To resolve this, the present invention further comprises a push-pull solenoid 22, an engagement plate 24, and a second hole 25 that physically lock the first mounting plate 1 to the second mounting plate 4. The push-pull solenoid 22 acts as a first interlocking element and is integrated into the first mounting plate 1. The engagement plate 24 and the second hole 25 act as a second interlocking element and are integrated into the second mounting plate 4. Specifically, the push-pull solenoid 22 is an electromagnetic actuator that extends and retracts a locking pin 23, wherein the locking pin 23 is a slug of metal. The push-pull solenoid 22 is positioned in between the servomotor 7 and the hinge mechanism 18. Additionally, the push-pull solenoid 22 is adjacently mounted to the first mounting plate 1. Referring to FIG. 3 and FIG. 4, the engagement plate 24 is adjacently connected to the rear surface 5 of the second mounting plate 4, adjacent to the push-pull solenoid 22. The second hole 25 is sized to receive the locking pin 23 and normally traverses through the engagement plate 24. When the present invention is positioned into the functional configuration, the first mounting plate 1 and the second mounting plate 4 are positioned perpendicular to each other. This positions the engagement plate 24 and the second hole 25 directly inline within the push-pull solenoid 22. Specifically, the second hole 25 and the engagement plate 24 are designed such that in the functional configuration the locking pin 23 coincidentally aligns with the second hole 25. The functional configuration is secured into place with the push-pull solenoid 22 being engaged such that the locking pin 23 is engaged within the second hole 25.

In the preferred embodiment of the present invention, the push-pull solenoid 22 is mounted within the housing enclosure 16. Specifically, the push-pull solenoid 22 is positioned within the first hole 17 and is mounted within the housing enclosure 16. Additionally, the push-pull solenoid 22 is oriented such that the locking pin 23 is positioned adjacent to the output shaft 8 of the servomotor 7.

Referring to FIG. 2, the first mounting plate 1 and the second mounting plate 4 may be positioned into the collapsed configuration when the motorcycle is not in use. For this, the locking pin 23 is retracted into the push-pull solenoid 22 and the servomotor 7 is activated until the second mounting plate 4 rotates about the main axis 19 to be positioned adjacent to the first mounting plate 1, opposite the servomotor 7. In particular, the servomotor 7 is activated until the second mounting plate 4 is oriented parallel to the first mounting plate 1.

Figure 5:
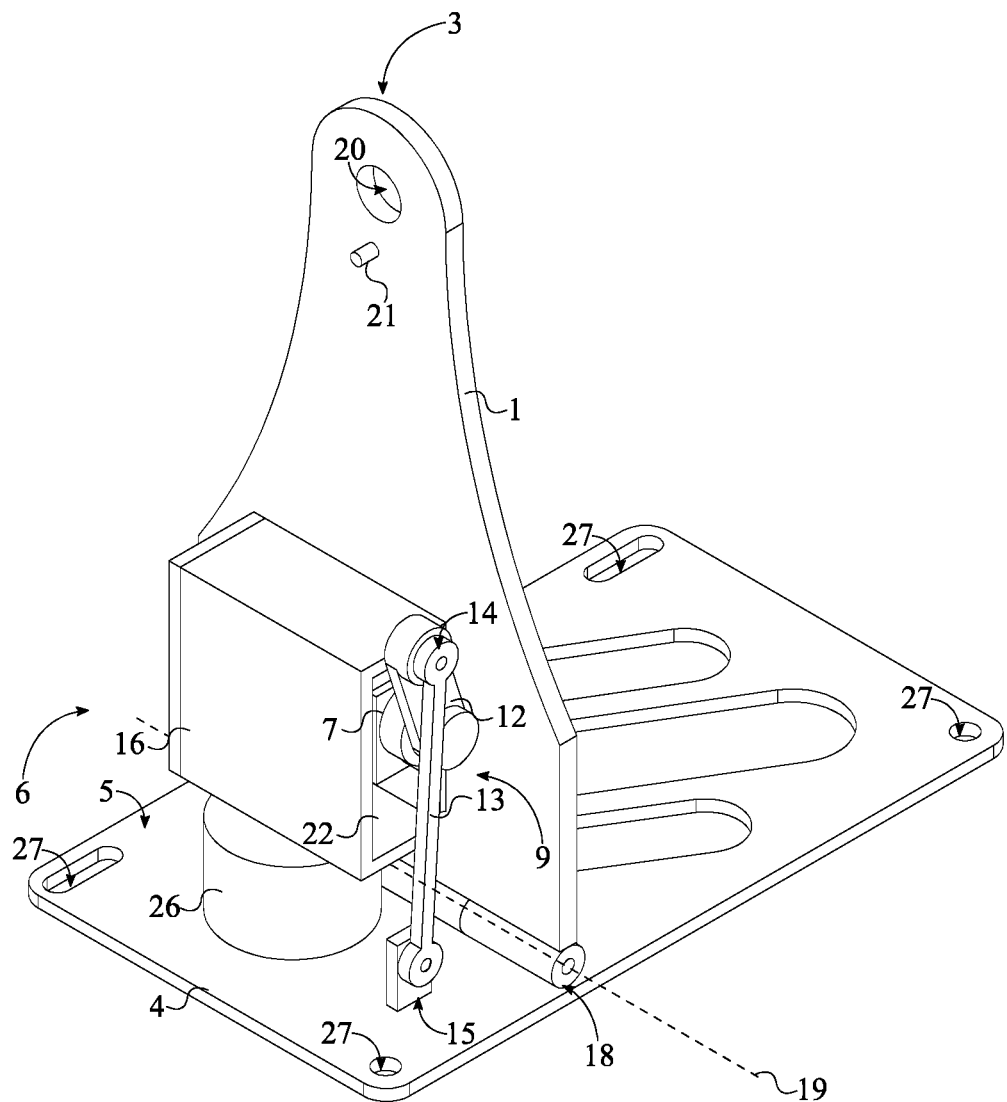
FIG. 5 is a bottom perspective view of an alternative embodiment of the present invention.

In an alternative embodiment, referring to FIG. 5, the present invention utilizes an electromagnet 26 instead of the push-pull solenoid 22 and the engagement plate 24 to lock the present invention in the functional configuration. The electromagnet 26 is positioned in between the housing enclosure 26 and the hinge mechanism 18 and is adjacently connected to the housing enclosure 16. In the functional configuration, the electromagnet 26 is magnetically attached to the second mounting plate 4, wherein the second mounting plate 4 is composed of ferromagnetic material. It is preferred that the electromagnet 26 is positioned in between the servomotor 7 and the second mounting plate 4, wherein the electromagnet 26 is mounted to the first mounting plate 1.

To attach a license plate to the second mounting plate 4, the present invention further comprises a plurality of fastening holes 27. The plurality of fastening holes 27 is a series of pre-drilled openings that serves as attachment points for a license plate. The plurality of fastening holes 27 is distributed about the second mounting plate 4 with each of the plurality of fastening holes 27 normally traversing through the second mounting plate 4 as seen in FIG. 1. The plurality of fastening holes 27 includes four corner holes. The corner holes comply with the standard attachment means for license plates. The corner holes allow the user to attach a license plate using standard nut and bolt fasteners. The number within the plurality of fastening holes 27 is subject to change to meet the needs and preferences of the user. Additionally, the size, location, and design of each of the plurality of fastening holes 27 is subject to change to meet the needs and preferences of the user. In one embodiment of the present invention, the plurality of fastening holes 27 comprises an at least one elongated slot. The elongated slot is centrally positioned on the second mounting plate 4 and normally traverses through the second mounting plate 4. The elongated slot a cut out that allows a piece of reflective material to be overlaid on to elongated slot. In the preferred embodiment of the present invention, the elongated slot serves as a template for a layer of reflective material to be overlaid on to the elongated slot. In various embodiments of the present invention, the elongated slot can take form of various shapes and sizes. In another embodiment of the present invention, the elongated slot can be filled in with reflective material.

Referring to FIG. 2, for aerodynamic and aesthetic purposes, the first mounting plate 1 tapers from the first end 2 of the first mounting plate 1 towards the second end 3 of the first mounting plate 1. Additionally, it is preferred that the second end 3 of the first mounting plate 1 is rounded.

In one embodiment, the present invention further comprises a stop 28. The stop 28 is a rectangular extrusion which prevents the second mounting plate 4 from swinging past a 90-degree orientation relative to the first mounting plate 1. Specifically, when the servomotor 7 is rotating the second mounting plate 4 about the hinge mechanism 18 from the collapsed configuration to the functional configuration, the stop 28 physically obstructs the second mounting plate 4 from being positioned adjacent to the housing enclosure 16. For this, the stop 28 is positioned adjacent to the automatic pivoting mechanism 6 and the rear surface 5 of the second mounting plate 4. Additionally, the stop 28 is adjacently connected along the hinge mechanism 18. The stop may be implemented in a variety of means and mechanisms. In the simplest version, the stop 28 is integrated into the hinge mechanism 18.

The present invention is powered by the battery of the motorcycle and includes a controller. The controller is a PCB board that is housed in the battery compartment of the motorcycle. The controller is directly wired in to the key switch and the kill switch of the motorcycle. This configuration facilitates older-style motorcycles. In another embodiment of the present invention, the controller can directly wire in to the key switch, and the indicator switch of a motorcycle. This configuration facilitates newer-style motorcycles, where the indicator switch is implemented on the kick-stand of the motorcycle. The controller is wired directly into the motorcycle and reads the status of the motorcycle, specifically to determine if the motorcycle is turned on or turned off. The controller is a circuit box which regulates the electrical supply to the servomotor 7 and the push-pull solenoid 22. The controller is directly wired to the power source, the battery, of the motorcycle and serves as the power supply for the servomotor 7 and the push-pull solenoid 22. The controller comprises a reducer, a plurality of relays, a plurality of testers, a fuse, and a case. The reducer is wired on to the key switch, and the ground of a motorcycle. More specifically, the reducer lowers the 12 volt-voltage output of the motorcycle's power supply to 6-volts. The plurality of relays is wired on to the kill-switch, and/or the kick-stand switch of a motorcycle, depending on the style of the motorcycle. More specifically, the plurality of relays acts as switches that diverts the current of the plurality of testers to retract/detract the second bracket from the first bracket. The plurality of testers is wired on to the reducer and the plurality of relays. Additionally, the plurality of testers interacts with the servomotor 7 to retract/detract the second mounting plate 4. More specifically the plurality of testers is a servo microcontroller system that specifically controls the servomotor 7 to retract or detract by sending a generated pulse to the signal end of the servomotor 7. The plurality of testers comprises a first tester, and a second tester. The first tester is wired on the reducer and the servo. More specifically, the first tester is calibrated to send a pulse to the signal member of the servomotor 7 to retract the second mounting plate 4 to the first bracket when the kill-switch and/or kick-stand switch deactivates the motorcycle. The first tester further comprises of a first dial. The first dial of the first tester is a pulse adjuster that allows a user to adjust the retraction angle of the present invention. The second tester is wired on the reducer and the servomotor 7. More specifically, the second tester is calibrated to send a pulse to the signal member of the servo to detract the second mounting plate 4 from the first mounting plate 1 when the key switch of the motorcycle is activated. The second tester further comprises of a second dial. The second dial of the second tester is a pulse adjuster that allows a user to adjust the detraction angle of the present invention. The first fuse is wired in to the key switch of the motorcycle. More specifically, the first fuse is an inline fuse the protects the controller from short circuiting. The second fuse is wired in to the kill switch and/or kickstand switch of the motorcycle. More specifically, the second fuse is an additional inline fuse the protects the controller from short circuiting. The case is located in the battery compartment of a motorcycle. More specifically, the case houses and secures the PCB from weather, and or external damage. Additionally, the case is adhered in the inside of the motorcycles compartment.

When the motorcycle is turned off, the controller activates the servomotor 7 in order to position the present invention into the collapsed configuration. When the motorcycle is turned on, the controller activates the servomotor 7 to position the present invention into the functional configuration. This ensures that the rider does not accidentally drive around with the license plate collapsed and hidden.

In another embodiment of the present invention, the controller may be replaced with a mechanical system, where the present invention is adapted with a gearbox, pulley, and/or cable system that interacts with the motorcycle's kickstand in order to activate the servomotor 7 based on the kickstand's positioning.

Although the invention has been explained in relation to its preferred embodiment, it is to be understood that many other possible modifications and variations can be made without departing from the spirit and scope of the invention as hereinafter claimed.

What is claimed is:

1. An autonomous flip-up license plate mount for motorcycles comprising:
    a first mounting plate;
    a second mounting plate;
    an automatic pivoting mechanism;
    a hinge mechanism;
    the automatic pivoting mechanism comprising a servomotor and a control linkage;
    a first end of the first mounting plate being adjacently connected to and along the hinge mechanism;
    the second mounting plate being positioned adjacent to the hinge mechanism, opposite the first mounting plate;
    the hinge mechanism being connected to and along a rear surface of the second mounting plate;
    the second mounting plate being rotatably mounted to the first mounting plate by the hinge mechanism, about a main axis of the hinge mechanism;
    the automatic pivoting mechanism being positioned adjacent to the first end of the first mounting plate;
    the servomotor being adjacently mounted to the first mounting plate;
    an output shaft of the servomotor being oriented parallel and offset to the main axis of the hinge mechanism;
    the control linkage comprising a first end and a second end;
    the first end of the control linkage being torsionally mounted to the output shaft of the servomotor; and
    the second end of the control linkage being rotatably mounted to the rear surface of the second mounting plate.

2. The autonomous flip-up license plate for motorcycles as claimed in claim 1 further comprising:
    a mounting hole;
    a tension pin;
    the mounting hole being positioned adjacent to a second end of the first mounting plate;
    the mounting hole normally traversing through the first mounting plate;
    the tension pin being positioned adjacent to the mounting hole, opposite the second end of the first mounting plate; and
    the tension pin being connected normal and adjacent to the first mounting plate.

3. The autonomous flip-up license plate for motorcycles as claimed in claim 1 further comprising:
    the control linkage comprising a first control arm and a second control arm;
    the first control arm being terminally and torsionally connected to the output shaft of the servomotor;
    the second control arm being positioned in between the first control arm and the second mounting plate;
    a first end of the second control arm being rotatably mounted to the first control arm, opposite the servomotor;
    a second end of the second control arm being positioned offset to the hinge mechanism, along the second mounting plate; and
    the second end of the second control arm being rotatably mounted to the second mounting plate.

4. The autonomous flip-up license plate for motorcycles as claimed in claim 1 further comprising:
    the automatic pivoting mechanism further comprising a housing enclosure and a first hole;
    the housing enclosure being positioned adjacent to a rear surface of the first mounting plate;
    the housing enclosure being adjacently connected to the first mounting plate;
    the first hole traversing into the housing enclosure, parallel to the rear surface of the first mounting plate;
    the servomotor being positioned within the first hole;
    the servomotor being mounted within the housing enclosure;
    the servomotor being mounted to the housing enclosure within the first hole; and
    the output shaft of the servomotor extending out of the housing enclosure, through the first hole.

5. The autonomous flip-up license plate for motorcycles as claimed in claim 4 further comprising:
    a push-pull solenoid;
    the push-pull solenoid being positioned in between the servomotor and the hinge mechanism;
    the push-pull solenoid being positioned within the first hole;
    the push-pull solenoid being mounted within the housing enclosure; and
    a locking pin of the push-pull solenoid being positioned adjacent to the output shaft of the servomotor.

6. The autonomous flip-up license plate for motorcycles as claimed in claim 1 further comprising:
    a push-pull solenoid;
    an engagement plate;
    a second hole;
    wherein the first mounting plate and the second mounting plate are configured into a functional configuration;
    the first mounting plate being positioned perpendicular to the second mounting plate;
    the push-pull solenoid being positioned in between the servomotor and the hinge mechanism;
    the push-pull solenoid being adjacently mounted to the first mounting plate;
    the engagement plate being oriented perpendicular to the first mounting plate and the second mounting plate;
    the engagement plate being adjacently connected to the rear surface of the second mounting plate, adjacent to the push-pull solenoid;
    the second hole normally traversing through the engagement plate; and
    a locking pin of the push-pull solenoid being engaged within the second hole.

7. The autonomous flip-up license plate for motorcycles as claimed in claim 4 further comprising:
    an electromagnet;
    the electromagnet being positioned in between the housing enclosure and the hinge mechanism; and
    the electromagnet being adjacently connected to the housing enclosure.

8. The autonomous flip-up license plate for motorcycles as claimed in claim 1 further comprising:
    an electromagnet;
    wherein the first mounting plate and the second plate are configured into a functional configuration;
    wherein the second mounting plate is made of ferromagnetic material;

the first mounting plate being positioned perpendicular to the second mounting plate;
the electromagnet being positioned in between the servomotor and the second mounting plate;
the electromagnet being adjacently mounted to the first mounting plate; and
the electromagnet being magnetically attached to the second mounting plate.

9. The autonomous flip-up license plate for motorcycles as claimed in claim 1 further comprising:
a plurality of fastening holes;
the plurality of fastening holes being distributed about the second mounting plate; and
each of the plurality of fastening holes normally traversing through the second mounting plate.

10. The autonomous flip-up license plate for motorcycles as claimed in claim 1 further comprising:
wherein the first mounting plate and the second mounting plate are configured into a collapsed configuration;
the second mounting plate being positioned parallel to the first mounting plate; and
the second mounting plate being positioned adjacent to the first mounting plate, opposite the servomotor.

11. The autonomous flip-up license plate for motorcycles as claimed in claim 1, wherein the first mounting plate tapers from the first end of the first mounting plate towards the second end of the first mounting plate.

12. The autonomous flip-up license plate for motorcycles as claimed in claim 1 further comprising:
a stop;
the stop being positioned adjacent to the automatic pivoting mechanism;
the stop being positioned adjacent to the rear surface of the second mounting plate; and
the stop being adjacently connected along the hinge mechanism.

* * * * *